Figure 1:
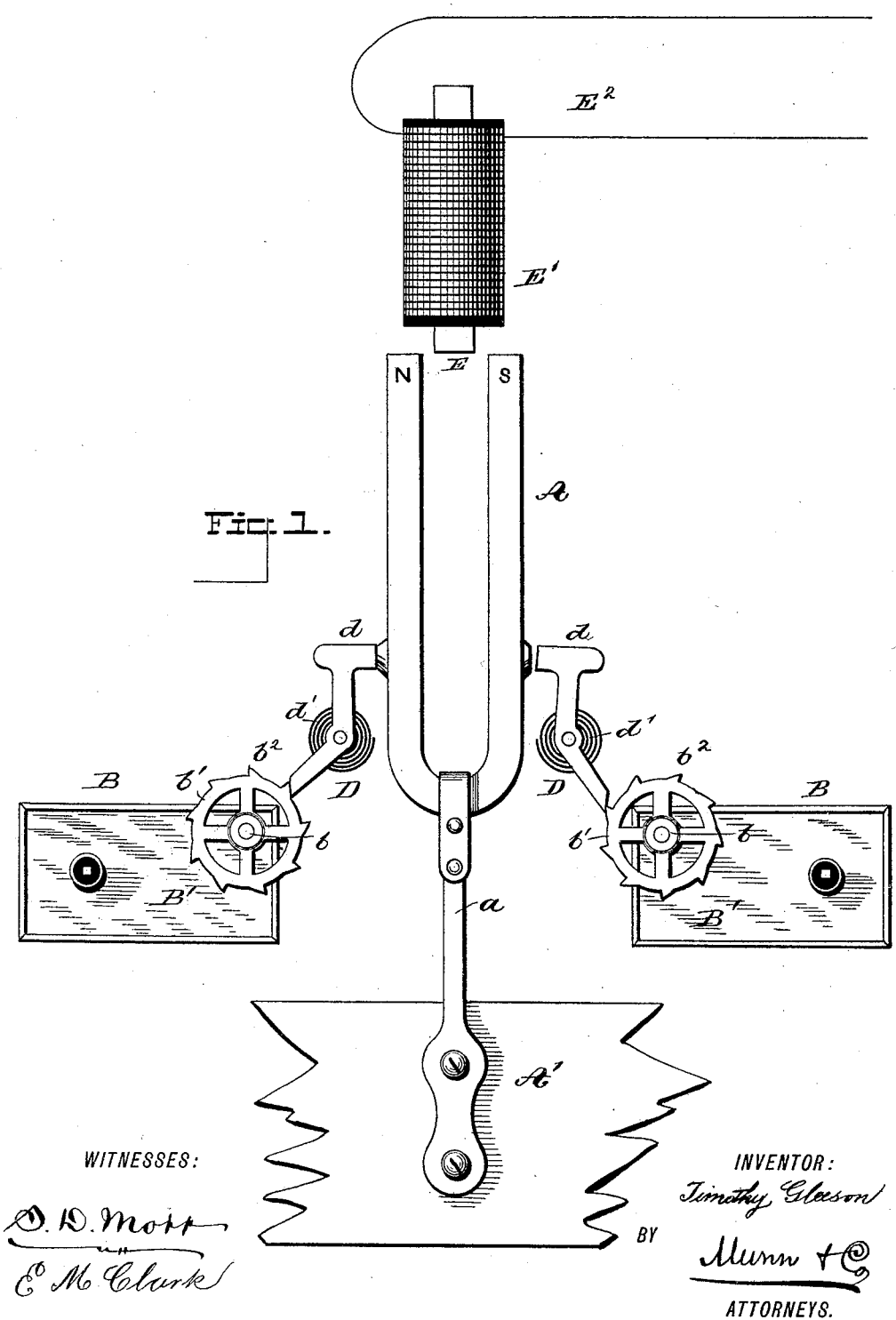

(No Model.) 2 Sheets—Sheet 1.

T. GLEESON.
APPARATUS FOR GENERATING ELECTRICITY.

No. 405,471. Patented June 18, 1889.

WITNESSES:
D. D. Mott
E. M. Clark

INVENTOR:
Timothy Gleeson
BY
Munn & Co.
ATTORNEYS.

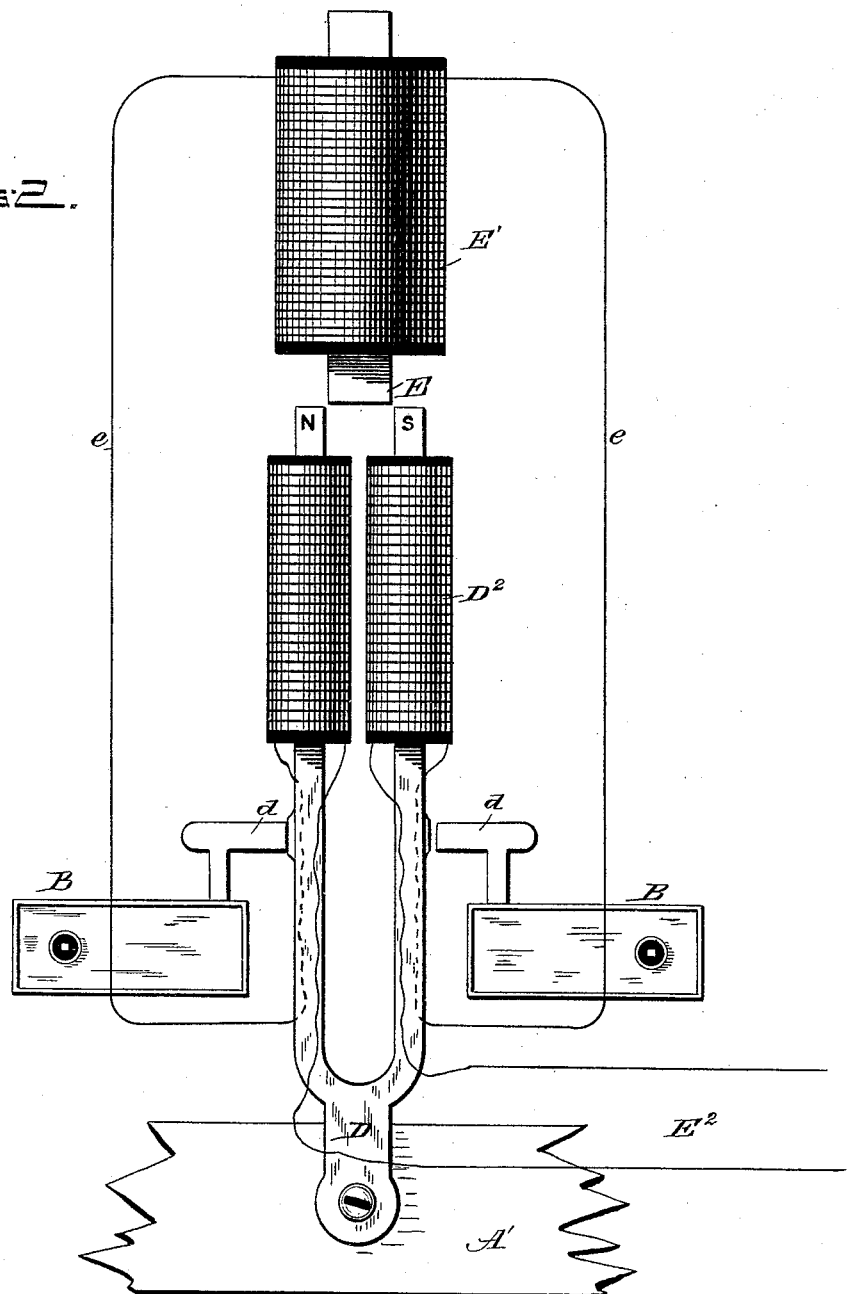

UNITED STATES PATENT OFFICE.

TIMOTHY GLEESON, OF BROOKLYN, NEW YORK.

APPARATUS FOR GENERATING ELECTRICITY.

SPECIFICATION forming part of Letters Patent No. 405,471, dated June 18, 1889.

Application filed July 25, 1888. Serial No. 280,964. (No model.)

*To all whom it may concern:*

Be it known that I, TIMOTHY GLEESON, of Brooklyn, in the county of Kings and State of New York, have invented a new and Improved Apparatus for Generating Electricity, of which the following is a full, clear, and exact description.

My invention relates to an improvement in apparatus for generating electricity suitable for telephonic currents or for operating bell-signals, and has for its object to provide a means of vibrating a permanent magnet by clock-work or other motor to generate a current.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both figures.

Figure 1 is a front elevation of a device in which a permanent vibrating magnet is employed, and Fig. 2 is a front elevation of a modification.

In carrying out the invention, A represents a permanent horseshoe-magnet, which magnet is secured to any suitable support A' by a strip or plate of spring-brass $a$, whereby the said magnet when struck from either side will readily vibrate. A vibrating motion is imparted to the magnet A by motors B, one motor being arranged at each side. The preferred form of motor employed is clock-work, contained in a suitable case B'. To the shaft $b$, projecting from the case and rotated by said clock-work, a wheel $b'$ is keyed or otherwise secured, provided upon the periphery with a series of ratchet-teeth $b^2$, which teeth are adapted to engage with the lower extremity of an angled or elbow lever D, the upper end of the said lever being formed in the shape of a hammer-head $d$.

The hammer-head $d$ of the elbow-lever is normally held in contact with the permanent magnet A by a spring $d'$, attached to said lever preferably at or near the fulcrum.

Above the permanent magnet A a core E, of soft iron, is supported, which core may consist of a bundle or group of wire rods, and the said core E is surrounded by a coil E' of insulated wire, the ends of the said wire being led away in any desired direction to form the consumption-circuit $E^2$, leading to a telephone or a signal-bell. The core and coil are preferably so located with respect to the permanent magnet that the said core will be in alignment with the space intervening the poles of magnet when the same is held stationary.

In operation, when the clock-work is set in motion, the hammers alternately strike and vibrate the permanent magnet, which vibratory motion of the poles of the magnet causes the soft-iron core to become an electro-magnet, whereupon electricity is produced in the coil around the core by induction in proportion to the number of vibrations of the said magnet. When a stronger current is required, the permanent magnet is exchanged for an electro-magnet, wired so that it becomes excited by its own induced current, as shown in Fig. 2. In this figure the soft-iron fork D is secured to the support A', and the wires $e$ from the coil E' pass up the back of the fork D, and are formed into the coil $D^2$, then pass down the front of the said fork, and lead away to form the consumption-circuit $E^2$. The action is as follows: The soft-iron fork is magnetized by allowing a current from a battery to pass around its poles. This core will always retain some of its magnetism sufficient to generate a feeble current when vibrating. This feeble current passing around fork-prongs excites the same so as to produce stronger currents, and these stronger currents, acting again on prongs of fork, produce a more powerful electro-magnet—that is to say, the whole of the soft-iron fork becomes magnetically saturated, and is then in condition to produce powerful currents of electricity.

Having thus described my invention, what I claim as new, and desire to secure by Letters Patent, is—

1. An apparatus for generating electricity, consisting of a vibratory magnet and a soft-iron core supported above the magnet and surrounded by an insulated coil, substantially as described.

2. In an apparatus for generating electricity, the combination of a magnet, means for alternately moving the magnet in opposite directions, a soft-iron core supported above the magnet, and an insulated coil surrounding said core, substantially as herein shown and described.

3. In an apparatus for generating electricity, the combination of a vibratory magnet, motors for vibrating said magnet, a soft-iron core supported above the magnet, and an insulated coil surrounding said core, substantially as described.

4. In an apparatus for generating electricity, the combination, with a forked vibrating contact-maker, of spring-actuated hammers engaging opposite sides of the fork, and means, substantially as shown and described, for alternately actuating said hammers, as and for the purpose specified.

5. In a machine for generating electricity, the combination, with a forked vibratory stationary magnet, of spring-actuated hammers engaging opposite faces of the said magnet, and clock mechanism alternately actuating said hammers, substantially as shown and described.

6. In a machine for generating electricity, the combination, with a forked vibratory stationary magnet, a soft-iron core suspended above the poles of the magnet, and an insulated coil surrounding said core, of spring-actuated hammers engaging opposite sides of said magnet, and mechanism, substantially as shown and described, for alternately actuating said hammers, whereby the core and coil are converted into an electric magnet, as and for the purposes specified.

TIMOTHY GLEESON.

Witnesses:
JOHN H. NORRIS,
WM. C. MATLOCK.